Sept. 7, 1937.  E. W. ASHTON  2,092,710
MEAT MARKER
Filed Aug. 27, 1934  2 Sheets-Sheet 1
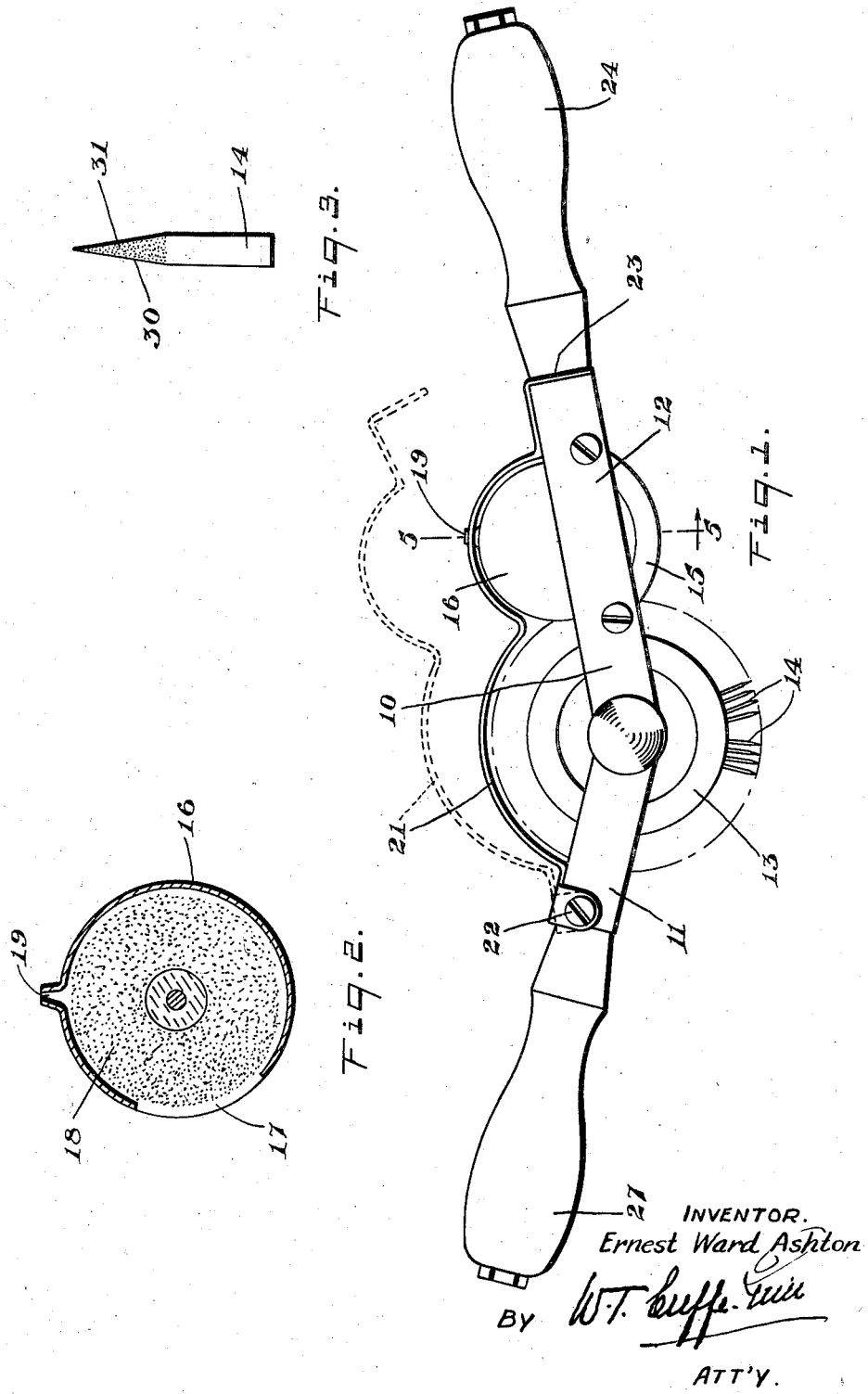
INVENTOR.
Ernest Ward Ashton
BY
ATT'Y.

Sept. 7, 1937.  E. W. ASHTON  2,092,710
MEAT MARKER
Filed Aug. 27, 1934  2 Sheets-Sheet 2
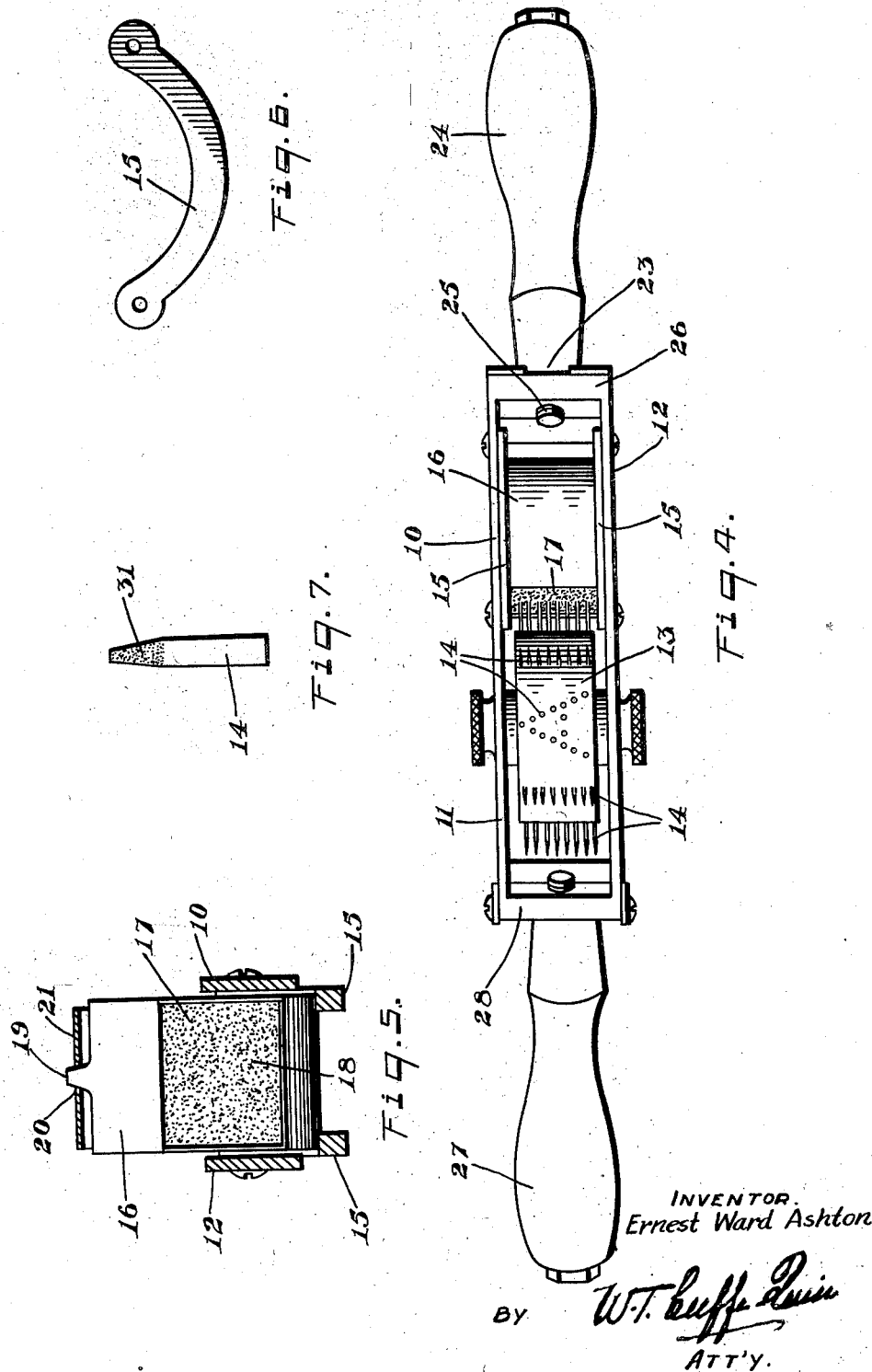
INVENTOR.
Ernest Ward Ashton
BY
ATT'Y.

UNITED STATES PATENT OFFICE

2,092,710

MEAT MARKER

Ernest Ward Ashton, Ottawa, Ontario, Canada

Application August 27, 1934, Serial No. 741,630

4 Claims. (Cl. 101—24)

This invention relates to meat markers generally and more particularly to that class of devices hereunder known as rotary hand markers.

One object of the invention is to provide a light, durable device of this kind operable with both hands to exert uniform pressure, and which is so designed and formed as to be movable over the uneven portions of an animal carcass to smoothly and efficiently mark the same, and without the hands of the operator coming into contact with the carcass.

Another object is to provide a marking device of this description which in marking meat and the like will make a clean, readily readable, permanent mark which will not smudge or blot.

In devices of this kind heretofore and at the present in use, the smudging of the marking has been a very serious objection, practically obliterating the mark and spoiling the appearance of it as well as of the object marked. This has been due to the fact that the surface of the marking needles or elements has been smooth so that when they penetrate the meat the marking ink is automatically rubbed off by contact with the meat to form a deposit or blob on the surface of the meat, which readily becomes a smudge or blot. To overcome this I have provided semi-tattooing needles, the smooth surface of which at their piercing extremities is made rough in any suitable manner, to cause the ink to remain there and be carried into the meat by the needles, thereby leaving no deposit on the outer surface of the meat to become smudged or blotted, and thus providing a permanently clean legible mark. It will be understood that where the marking elements are blunt and used more for stamping the meat than semi-tattooing it, the same satisfactory results are obtained.

It will also be seen from the foregoing that the marking of meat and such like in this way is a distinct step in advance in the art, and in the new and useful results obtained from a practical and commercial standpoint.

Furthermore, applicant, insofar as he is aware, believes himself to be the first to provide a meat marker with needles or marking elements adapted to automatically cause the marking ink to remain thereon, and be carried thereby into the object being marked, thus eliminating smudging of the mark, and he desires to claim the same broadly.

With the foregoing and other objects the invention comprises a substantially V-shaped frame, a rotatable roller, marking elements provided with ink retaining means projecting from the periphery of said roller, a handle at each free end of the frame, a detachable ink reservoir in the frame, an inking pad rotatable in the reservoir and in contact with the marking elements, a combined guard and reservoir retaining plate swingingly mounted on the frame.

The invention will be best understood by reference to the following description when taken in connection with the accompanying drawings illustrating a specific embodiment thereof, while the scope of the invention will be more particularly pointed out in the claims.

Referring now to the drawings and to the embodiment of the invention therein disclosed for illustrative purposes only and in which like numerals of reference indicate corresponding parts in each figure:—

Fig. 1 is a side elevation of the marker.

Fig. 2 is an enlarged detail of the ink reservoir.

Fig. 3 is a detail of the marking needle showing the surface of the piercing extremity treated to retain the marking ink.

Fig. 4 is a bottom plan view of the meat marker.

Fig. 5 is a section on line 5—5 of Fig. 1.

Fig. 6 is an enlarged detail of the supporting plate for the ink reservoir in the frame.

Fig. 7 is a detail of a modified form of marking element or needle with blunt end, and ink retaining portion associated therewith.

Referring more particularly to the drawings 10 designates a frame of suitable material and here shown as substantially V-shaped and channelled with arms 11 and 12. Rotatably mounted at the meeting point of these arms is a roller or wheel member 13, from the periphery of which project the needles or marking elements 14, rigidly arranged to form as may be required a distinguishing mark. Behind the roller 13, and supported on the semi-circular plate 15 in the frame 10 is detachably mounted an ink reservoir 16, having an opening 17 in the side registering with the needles 14 on the roller, and provided within with a felt ink roller 18 adapted to contact as shown in Fig. 4 with the needles or marking elements 13. The reservoir is also formed with a filling spout 19, which is adapted to engage with an opening 20 in a combined guard and reservoir holding plate 21, pivotally mounted at one end as at 22 on the frame and adapted, as at 23, at the other end to embrace the end of the frame and to be rigidly held in position there by the handle 24, adjustably secured, as at 25, to the end 26 of the frame; a corresponding handle similarly secured being provided at the opposite end 28 of the frame 10.

It will thus be seen that the combination of a substantially V-shaped frame 10 with the handles 27 and 24 at each end, and the marking roller 13 rotatably mounted therein at substantially the apex of the frame, provides for evenly exerted pressure by the operator in the operation of marking, and further provides that notwithstanding unevenness and ups and downs in the carcass being marked, that the operator's hands will at no time come into contact with the surface thereof. These are important features from a practical standpoint in insuring uniformity and efficiency in the marking of meat or the like.

We now come to an essential feature of my improved meat marker, and this as illustrated particularly in Figs. 3 and 7 consists in making the surface preferably of the piercing portions 30 of the needles or marking elements 13 rough as at 31. This can be done in any suitable or convenient manner, and has for its object to cause the marking ink to be retained on the needle, so that when in operation the needles penetrate into the surface of meat or the like, the marking ink thereon instead of being rubbed off as is the case when the surface of the needles is smooth, will be carried into the meat, and thus provide a semi-tattooed mark without leaving a blob of ink on the surface of the meat to eventually become a smudge. In thus providing smudgeless marking for meat with an anti-smudge needle or marking element, a long-felt want has been filled.

In operation the guard plate 21 being swung into position and secured there by the handle 24 rigidly holding the ink reservoir 16 in place with the spout 19 extending through the opening 20 therein, the operator then grasps the handles 24 and 27 and rapidly moves, while exerting pressure, the marker over the surface of the meat, causing the needles or marking elements 14 to penetrate into the surface of the meat, carrying the marking ink, and thus semi-tattooing it in a clean, legible and permanent manner without smudging. Simultaneously, the felt pad inking roller 18 in the reservoir 16 being in contact through the opening 17 with the needles is rotated thereby to continuously ink them. When necessary, without interfering with the guard plate 21, the reservoir 16 may be replenished with ink through the intake 19.

It should be noted that the opening 17 in the ink reservoir is preferably only of sufficient size to permit the needles to contact with the felt pad ink roller; the reason for this being that with the reservoir almost entirely closed, the ink therein will not tend to evaporate quickly.

As variations of the device may suggest themselves to those skilled in the art, it is not intended that the application should be limited to the particular example disclosed herein and modifications may, therefore, be made within the scope of the claims without departing from the spirit and scope of the invention.

What I claim for my invention is:

1. A meat marker comprising a substantially V-shaped frame with a handle at each end, a rotatable marking wheel with rigid meat marking needles adapted to retain marking ink, projecting from the periphery thereof, means for inking said needles comprising a reservoir detachable in the frame, and provided with a felt pad ink roller co-operative with the said needles, a swingingly mounted guard plate co-operative with the frame, and adapted to engage with, and rigidly hold, the reservoir in the frame.

2. A meat marker comprising a frame with a rotatable marking cylinder in the frame, rigid meat marking projections with roughened extremities to cause marking ink to adhere thereto extending from said cylinder, a handle suitably connected to each end of the frame, inking means for the projections comprising a reservoir with a side opening therein, and a filler spout, a felt pad roller in said reservoir, a guard plate swingingly mounted on the frame, rigidly securable at the other end, and intermediately adapted to clamp the reservoir.

3. A meat marker comprising a frame with a handle at each of its free ends, a marking wheel journalled in said frame and provided with rigid ink retaining marking elements, projecting from the periphery of said wheel, inking means comprising a reservoir and felt pad roller therein co-operative with the marking projections, a combined guard and reservoir retaining plate swingingly mounted on the frame at one end, and adapted to be rigidly secured to the frame at the other end.

4. A meat marker comprising a substantially V-shaped frame, handles at the extremities of the frame, a marking wheel rotatably mounted at the apex of the frame and rotatable inking means mounted on the frame operatively engaging the marking wheel.

ERNEST WARD ASHTON.